June 9, 1964    T. R. SMITH-MILLER    3,136,188
APPARATUS FOR APPLYING TRACTION CHAINS TO VEHICLE TIRES
Filed June 30, 1961    6 Sheets-Sheet 2

United States Patent Office 3,136,188
Patented June 9, 1964

3,136,188
APPARATUS FOR APPLYING TRACTION
CHAINS TO VEHICLE TIRES
Theodore R. Smith-Miller, R.F.D. 1, Mount Kisco, N.Y.
Filed June 30, 1961, Ser. No. 121,071
12 Claims. (Cl. 81—15.8)

This invention relates to the art of traction chains for vehicle wheels and, more particularly, to improved apparatus for readily applying a traction chain to a tire of a vehicle, such as an automobile, in a simple and expeditious manner under various conditions of use.

Reference is hereby made to my co-pending patent application Ser. No. 773,403, entitled "Device for Mounting Chains on Vehicles," now Patent No. 2,990,737.

Manual placement of full traction chains on vehicle tires, even under ideal working conditions, is a laborious and time-consuming procedure, which is usually wearisome and frequently dangerous and which almost always results in the hands and clothing of the person doing the work becoming soiled by contact with dirt, grease and the like. When traction chains are manually applied to tires under unfavorable conditions, the time and labor involved and the difficulties and hazards presented are correspondingly increased, depending on the conditions encountered at a particular time. There are many instances when it is virtually impossible for an individual to apply a full traction chain to a tire by hand. This is the case, for example, when vehicle driving wheels and their tires are mired in deep mud areas, in bodies of loose sand and in heavy snowfalls or snowdrifts. Happenings such as these are especially unfortunate for the reason that they constitute situations where traction chains are most needed to enable the vehicle to extricate itself from its mired location and proceed on its way.

The need for suitable mechanical equipment which is capable of being readily used by an individual to conveniently, and quickly, apply traction chains to tires has long been recognized. Also, many attempts have been made to fulfill this need. These attempts have brought forth several devices which are exemplified by the one disclosed in W. R. Bertelsen Patent No. 2,768,545, for "Automatic Tire Chain Applier and Holder." The devices known to the art have not been entirely satisfactory, however, due to various shortcomings and objections, including one or more of the following:

(1) They are incapable of being effectively used with a wide range of tire sizes;
(2) They do not operate properly when the vehicle is tilted in a sidewise direction; and
(3) Relatively movable parts of the devices are often accidentally shifted out of proper alignment during use, thereby rendering the devices inoperative to effect automatic coupling and locking of the chain latch mechanisms to corresponding links of the traction chain.

My present invention overcomes these difficulties and objections in that it provides apparatus for quickly applying traction chains to various size tires in a simple and trouble-free manner. The apparatus is intended for use with known full traction chains of the type that includes a pair of side chains, a plurality of cross chains, which extend between and are connected to the side chains, and a chain latch mechanism at one end of each side chain and adapted to form coupling engagement with a link at the other end of its side chain.

The apparatus of this invention consists of three basic units, namely a chain carrier unit, a tire clamp unit and a support unit.

As shown in the drawings and described in detail further along herein, the chain carrier unit is adjustable and is adapted to be employed with a wide range of tire sizes. This unit is adapted to carry the cross chains and a number of links of the side chains, to releasably hold the chain latching mechanisms, to engage the tread and side walls of a tire, to permit ready withdrawal of the cross chains and the links of the side chains in predetermined sequence in response to movement of the tire clamp unit, and to co-operate with the clamp unit to effect positive engagement and locking of the chain latching mechanisms with corresponding end links of the side chains.

The tire clamp unit, as in the case of the carrier unit, is also adjustable and is adapted to be employed with a wide range of tire sizes. The clamp unit is adapted to releasably hold the end links of the side chains, to engage and rotate with the tire in a manner to withdraw successive portions of the chain from the carrier unit and properly position the same on the tire, and to coact with the carrier unit to effect locking of the latch mechanisms to the chain end links, as mentioned above.

The support unit is adjustable to permit variations in its effective length and enable its being readily employed with different vehicles and under varying conditions of use. The principal function of the support unit is to firmly maintain the carrier unit in proper position relative to the tire, while the apparatus is in active service. This is accomplished by releasably connecting one end of the support unit to a fixed part of the vehicle, such as an automobile bumper, and the other end to the carrier unit.

The chain carrier unit and the tire clamping unit have their parts so constructed and arranged as to enable them to be easily and quickly located by hand in proper initial relative positions on the tire. The support unit, upon being connected to a fixed part of the vehicle and to the carrier unit, firmly maintains the carrier unit in place relative to the tire at all times during use. As a consequence, the chain latching mechanisms are always held in proper alignment by the carrier unit for subsequent engagement with the end links which are carried by the clamping unit.

It is recommended that the vehicle be equipped with two chain carrier units, two tire clamp units and a single support unit of this invention. It is also recommended that a traction chain be mounted on each carrier unit and corresponding clamping unit, ready for use, and that the several units and chains be stored in the trunk or other suitable compartment of the vehicle. When a need for the chains arises, the support unit is connected to one of the carrier units and the vehicle and the corresponding traction chain is applied to one of the tires, as will be described further along. The support unit is then disconnected from the vehicle and the carrier unit and is connected to the other carrier unit and re-connected to the vehicle. The other chain is then applied to a second tire. By preparing and proceeding in this manner, the time and the effort required to apply the chains to the tires in an emergency are both minimized.

The primary object of this invention is to provide improved apparatus to enable a person to readily apply a traction chain to a tire of a vehicle in a simple and expeditious manner under various conditions of use.

Another object of the invention is to provide apparatus that is adapted to apply traction chains to tires of different sizes.

The invention has for another object the provision of apparatus that is adapted to readily apply a traction chain to a vehicle tire regardless of whether the vehicle is disposed on a horizontal plane or on a plane which is inclined in one or more directions relative to a horizontal plane.

A further object of the invention is to provide tire chain-applying apparatus consisting of a chain carrier unit, a tire clamp unit and a support unit, which units are so constructed and arranged, when in active service, as to maintain the chain latching mechanisms and certain other elements of the chain in proper alignment in applying the chain to the tire.

A still further object of the invention is to provide apparatus of the character indicated that is sturdy and durable in construction, that is reasonable in manufacturing cost, and that is capable of performing its intended functions in an entirely satisfactory and dependable manner.

The enumerated objects and additional objects, together with the advantages of the invention, will be readily understood by persons trained in the art from the following detailed description and the accompanying drawings which respectively described and illustrate a preferred and recommended form of the invention.

In the drawings, wherein like reference numerals denote corresponding parts throughout the several views.

Referring initially to FIGS. 2 through 5, I have illustrated therein a chain carrier unit which is generally indicated by numeral 20. The carrier unit includes a chassis 21 that is made of one or more pieces of sheet metal which are cut, bent and joined together to obtain a base plate 22 having an elongated slot 23 (FIG. 4) a pair of spaced and axially aligned tubular parts 24 and an extension 25 intermediate the tubular parts and having a slot 26. Tubular parts 24 and extension 25 are positioned at the front end of the base plate and projects thereabove. Positioned at the rear end of the base plate and also projecting thereabove are a pair of spaced L-brackets 27, having aligned openings 28, and a U-shaped bracket 30 which is disposed between brackets 27 and consists of a web 31, having a relatively large slot 32 and a small opening 33, and a pair of parallel arms 34 which define notches 35.

Figure 3:
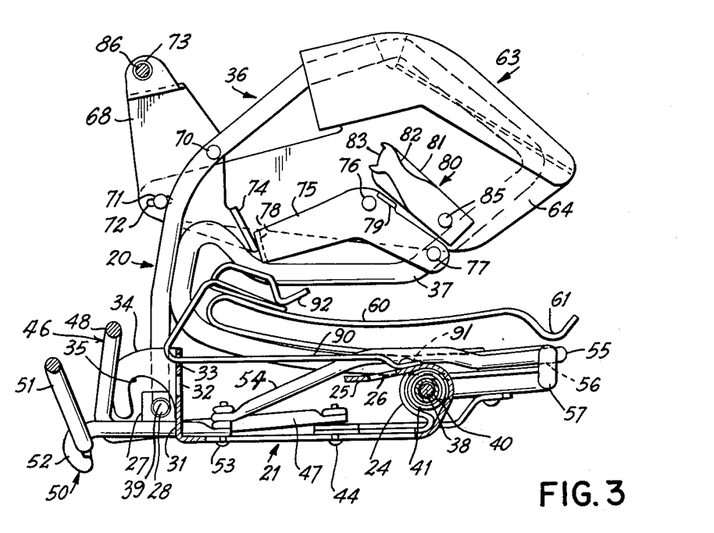
FIG. 3 is a view taken along line 3—3 of FIG. 2.

Chassis 20 supports a pair of side frames or arms 36 and associated parts. Each arm 36 comprises a rod 37 which is bent, as illustrated, and is formed with spaced parallel end parts 38 and 39, respectively. Each arm end part 38 is slidable in a corresponding end part of a guide tube 40 which is located in tubular members 24 (FIG. 3). Each arm end part 39 extends through opening 28 in a corresponding bracket 27 and is slidable relative to its bracket. This arrangement of arm end parts 38 and 39, guide tube 40 and aligned openings 27 of brackets 27 serves to support the arms 36 above base plate 22 and allow sliding movement of the arms toward and away from each other.

A helical spring 41 extends through the openings defined by tubular members 24 and surrounds guide tube 40. This spring is anchored at its ends to arms 36 in any desired manner known to the art and is stressed in tension to normally and yieldingly move the arms toward each other to the extent allowed by the chassis.

Figure 2:
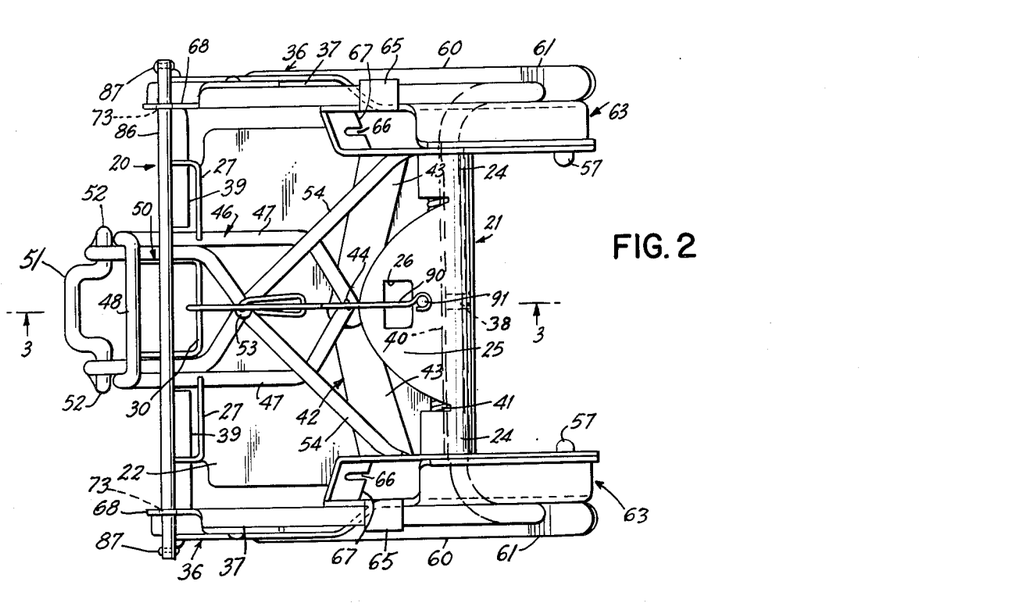
FIG. 2 is a top plan view of the chain carrier unit.
Figure 4:
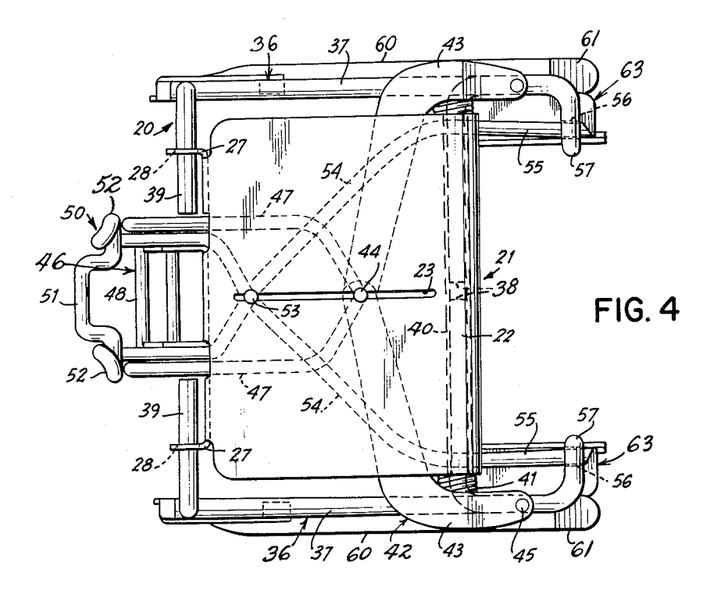
FIG. 4 is a bottom plan view of the carrier unit.

Arms 36 are adapted to be moved away from each other, against the action of spring 41, by an actuating means 42 which is best shown in FIGS. 2 and 4. This means comprises a pair of generally L-shaped links 43 which are each pivotally connected at one end to a pin or the like 44 that is slidable in slot 23 (FIG. 4). The other end of each link 43 is pivotally connected to a corresponding arm rod 37, as indicated at 45. Means 42 also comprises a handle 46, in the nature of a continuous link of the illustrated configuration. Handle 46 includes a pair of parallel slide parts 47, which are positioned between brackets 27, and an inverted U-shaped part 48, which projects upwardly from the outer ends of parts 47. The inner end of handle 46 is also pivotally connected to pin 44. It will be observed from an examination of FIGS. 2 and 4 that, when handle 46 is moved toward the right relative to chassis 21, links 43 are spread further apart and cause arms 36 to move away from each other, i.e. to expanded condition, against the action of spring 41.

Means 42 is adapted to be releasably held in a position to maintain arms 36 in expanded condition by a latching handle 50, which is also in the nature of a continuous link. Handle 50 includes an inverted U-shaped part 51, which is adapted to enter the space between bracket arms 34 (FIG. 5), and a pair of laterally extending loops 52. This handle forms a combined pivotal and tilting connection with a pin or the like 53 (FIGS. 2–4) which is slidable in slot 23. A pair of divergent rods 54 are also pivotally connected to pin 53. Each rod 54 terminates in a rectilinear finger 55. These fingers are parallel and are slidable through corresponding openings 56 in inwardly bent portions 57 of arm rods 37 (FIG. 4).

Figure 1:
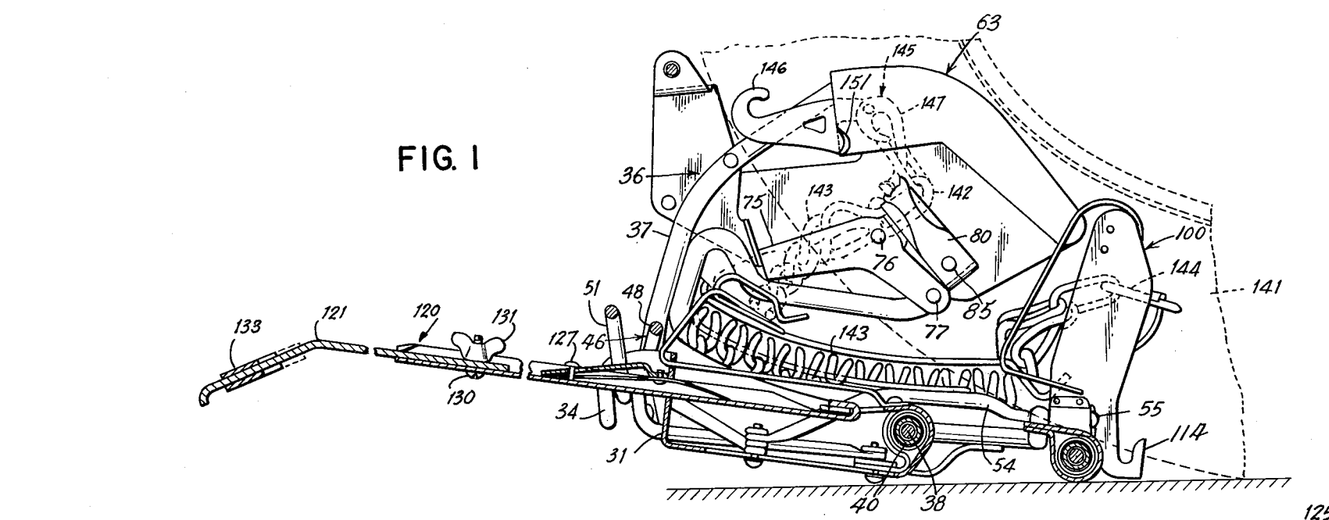
FIG. 1 is a view in central vertical cross section through an assembled arrangement of apparatus according to this invention, operatively associated with a vehicle tire, and illustrates the relative position of the parts before the tire clamp unit is released from the chain carrier unit.

When handle 46 has been operated to effect expansion of arms 36, as mentioned above, handle 50 is moved to the right from the position shown in FIG. 3 so that its loops 52 bear against the lower ends of inverted U-shaped member 48 and is then tilted upwardly so that the junctures of its inverted U-shaped part 51 and loops 52 register with notches 35 whereby handle 50 engages bracket 30 and arms 36 are maintained in expanded condition (FIG. 1). Also, rods 54 and their fingers 55 will have been moved toward the right, from the position shown in FIG. 3 to that shown in FIG. 1. The function of rods 54 and fingers 55 will be discussed further along in this description.

Latching handle 50 may be readily released from the bracket arms 34 by simply pressing it downwardly so as to slide it out of registry with notches 35. At that time, arms 36 will automatically move toward each other to the extent allowed by chassis 21, and actuating means 42, latching handle 50 and rods 54 will return to their relative position shown in FIG. 2 due to force exerted by spring 41.

Affixed to each arm rod 37 is a generally C-shaped spring blade 60 which is bent at its free end 61 (FIG. 3). These blades are parallel and define openings to receive the cross links of the chain.

Figures 5, 6:
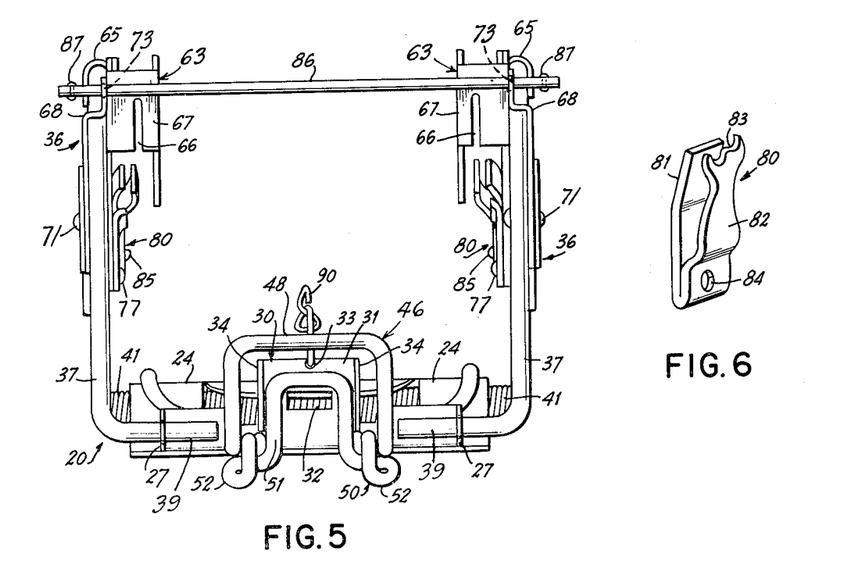
FIG. 5 is an elevation view of the carrier unit as seen from the left of FIG. 2.
FIG. 6 is an enlarged isometric view of a latch member that is an element of the carrier unit.

Each side frame or arm 36 also comprises an assembly of devices that are adapted to carry the latching mechanisms of the chain and coact with other parts to operate and then release the latching mechanisms when the chain is applied to the tire. This assembly comprises a receptacle 63 including an outer side wall 64 that has a bent extension 65 which engages and is slidable along an upper portion of a corresponding rod 37. Receptacle 63 is provided with a slot 66 in a wall 67 (FIG. 5). Each assembly also comprises a first lever 68 which is pivotally connected to its rod 37 at 70. As best shown in FIG. 3, each lever 68 is pivotally connected to receptacle wall 64 by a pin 71 which extends through a slot 72 in wall 64. Each lever 68 has an opening 73 and is bent to obtain a flange 74.

A second lever 75 is pivotally connected to each receptacle wall 64 at 76 and to the corresponding rod 37 at 77. This lever is formed with a flange 78, which is adapted to bear against flange 74 of the first lever, and another flange 79.

Adjacent each lever 75 is a latch 80 which, as best shown in FIG. 6, is generally V-shaped and consists of a pair of arms 81 and 82, the latter being recessed at its free end, as indicated at 83. Latch 80 has an opening 84 to receive a pin 85 whereby to form a pivotal connection with wall 64 (FIG. 3). A side edge of arm 81 is engaged by flange 79 of lever 75.

The chain carrier unit is provided with a cross bar 86 that is rectilinear and preferably circular in cross section. The cross bar extends through and is freely rotatable in openings 73 of levers 68. A pair of stop elements 87 (FIGS. 2 and 5) are attached to the end portions of the cross bar to prevent disengagement of the cross bar from lever 68.

The chain carrier unit is also equipped with a chain retainer spring 90 which is anchored at one end to extension 25, as indicated at 91 in FIG. 2, which extends through opening 33 in bracket 30 and which is formed at its free end with a hook element 92 (FIG. 3). Spring 90 is adapted to receive and releasably retain the first cross chain of the traction chain.

Reference is next had to FIGS. 7 through 11 for an understanding of the details of construction of the illustrated clamp unit which is identified by numeral 93 and which is generally U-shaped in configuration. The clamp unit comprises a base 94 which is made from a piece of sheet metal that is bent and joined at its ends to form a tubular member 95 and an extension 96. A guide tube 97 is disposed in and spaced from the tubular member. A helical spring 98 surrounds the guide tube and extends along and beyond the space between the guide tube and the tubular member. Midway between the ends of the base is a pin 99 which extends through and diametrically across the tubular member, the guide tube and the spring, and serves to maintain these parts in assembled relationship.

The clamp unit also comprises a pair of clamping arms or devices 100 which are movable toward and away from each other relative to base 94 and are adapted to engage the side walls of a tire. Each clamping arm includes an L-shaped rod consisting of an inner part 101, which is slidable along an end portion of guide tube 97 (FIG. 8), and an outer part 102, which projects upwardly of the base. Each rod inner part 101 is provided with a key 103 which registers with corresponding diametrically opposed slots 104 in the guide tube to permit limited sliding movement of the rod along the guide tube but prevent angular movement of the rod relative to the guide tube. Spring 98 is stressed in tension and is anchored at its ends to rod parts 102 by a suitable connector 105.

Figure 8:
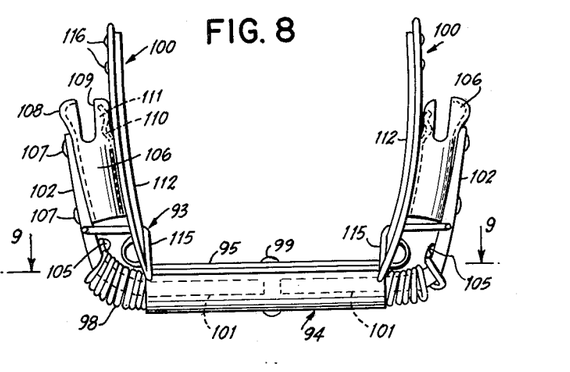
FIG. 8 is a rear elevation view of the clamp unit and illustrates the relative position of the parts when that unit is in fully closed or contracted condition.
Figure 9:
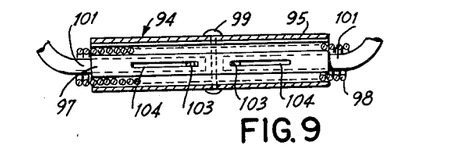
FIG. 9 is a view taken along line 9—9 of FIG. 8.
Figures 10, 11, 18, 19:
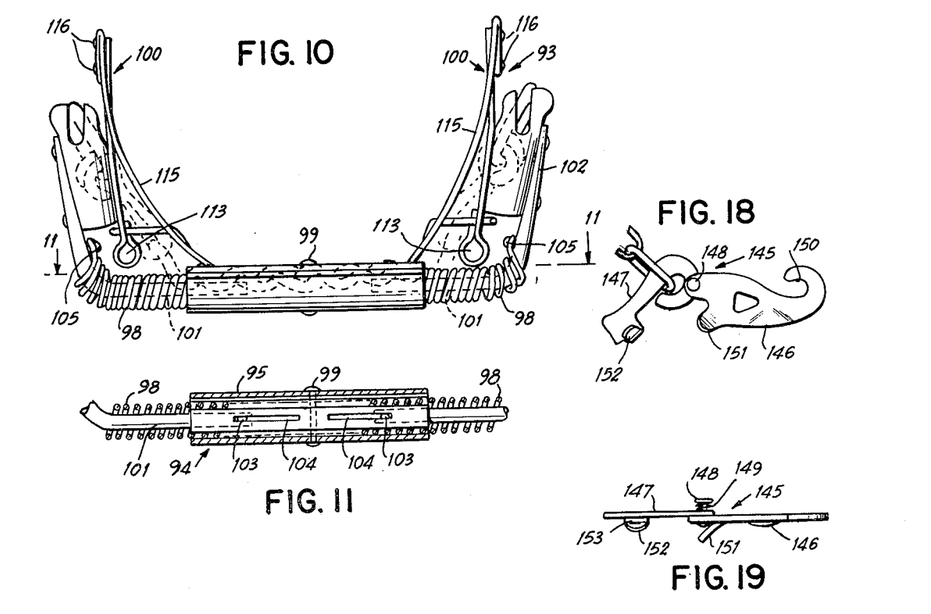
FIG. 10 corresponds to FIG. 8 and illustrates the relative position of the parts when the clamp unit is in fully open or expanded condition.
FIG. 11 is a view taken along line 11—11 of FIG. 10.
FIG. 18 is a plan view of the latching mechanism in open position and connected to an end of the chain.
FIG. 19 is a side elevation view of the latching mechanism shown in FIG. 18.

It will be noted from an examination of FIGS. 8 and 9 that spring 98 normally and yieldingly urges and maintains clamping arms 100 toward each other, i.e. in closed position relative to base 94, as allowed by keys 103. The clamping arms may be readily moved away from each other by hand, against the action of spring 98, from closed position (FIGS. 8 and 9) to fully open position (FIGS. 10 and 11).

Each clamping arm also includes a receptacle 106 which is adapted to releasably support a chain end link and which is affixed to corresponding rod outer part 102 by rivets or the like 107. Receptacle 106 is bent to form a recess 108 and is provided with a slot 109 that extends downwardly from its upper edge. The receptacle is equipped with a leaf spring 110 which is bent to form a recess 111 that is aligned with recess 108.

Figure 7:
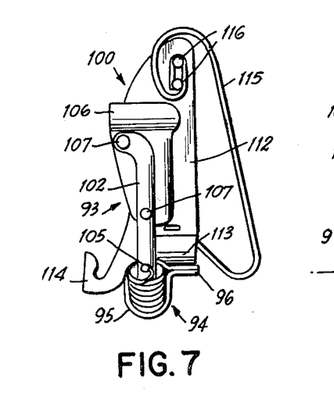
FIG. 7 is a side elevation view of the tire clamp unit.

A plate 112 is affixed to the side of each receptacle 106 remote from rod part 102 in any desired manner known to the art. This plate is configured to obtain a tubular element 113 and a hook element 114 at its lower end (FIG. 7). A chain separator spring 115 is secured at its upper end to the upper part of each plate 112 by connectors 116. The bent lower portion of this spring is slidable through an opening (not shown) in its plate 112.

Figure 12:
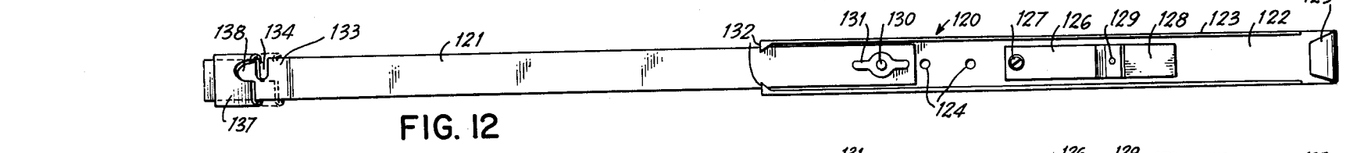
FIG. 12 is a top plan view of the support unit.
Figure 13:
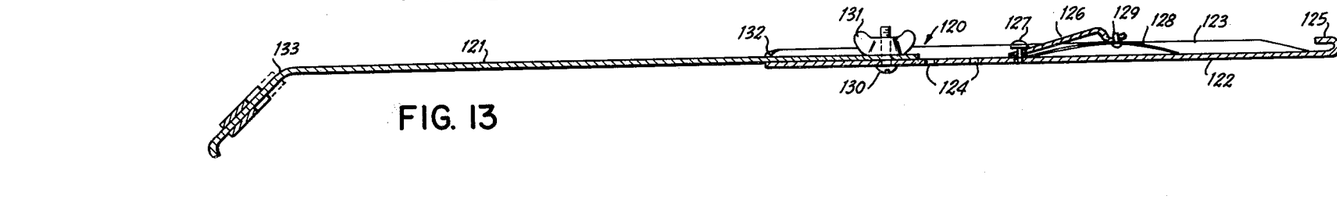
FIG. 13 is a central longitudinal cross section view of the support unit of FIG. 12.

The apparatus of this invention includes a support unit which is best shown in FIGS. 12 and 13 and which comprises a channel bar 120 and a flat bar 121. The channel bar comprises a web 122 and a pair of spaced parallel flanges 123. The web is provided with a plurality of longitudinally spaced openings 124 and is bent at its forward end to form a hook member 125. The channel bar carries a latching finger 126 which is loosely secured at one end to web 122 by a screw 127. The other end of the latching finger is secured to an arcuate leaf spring 128 by a suitable connector 129. The latching finger and the spring are positioned between flanges 123. The parts are so constructed and arranged that the latching finger normally projects above the flanges due to the action of the spring. When sufficient downward force is exerted against the latching finger, as viewed in FIG. 13, it will swing downwardly against the action of spring 128, to a position such that none of its parts project above the flanges.

Flat bar 121 is slightly narrower than the distance between flanges 123 and is adapted to be positioned between these flanges and bear against web 122. The flat bar is fastened to the channel bar by a bolt 130, which extends through a selected opening 124 and an opening (not shown) in the flat bar, and a wing nut 131. The rear ends of flanges 123 are inturned, as shown at 132, to assist in retaining the flat bar in engagement with the channel bar. The parts of the support unit are so arranged that its overall or effective length may be varied readily.

A bent rear part 133 of bar 121 is provided with an edge notch 134 for reception of the shank of a screw 135 (FIG. 14) which is attached to the rear bumper 136 or other conveniently accessible part of a vehicle. A keeper 137, having a notch 138, is slidable along bar part 133 and cooperates with other parts to releasably connect the support unit to the bumper.

As was stated earlier herein, the apparatus of this invention is adapted to apply a known type of full traction chain to a vehicle tire. Such a chain is generally denoted by numeral 140 and the tire by numeral 141 in several of the views. The traction chain comprises a pair of side chains 142 and a plurality of cross chains 143. Each side chain includes a terminal or end link 144 at one end and a latching mechanism 145 at its other end.

Figure 17:
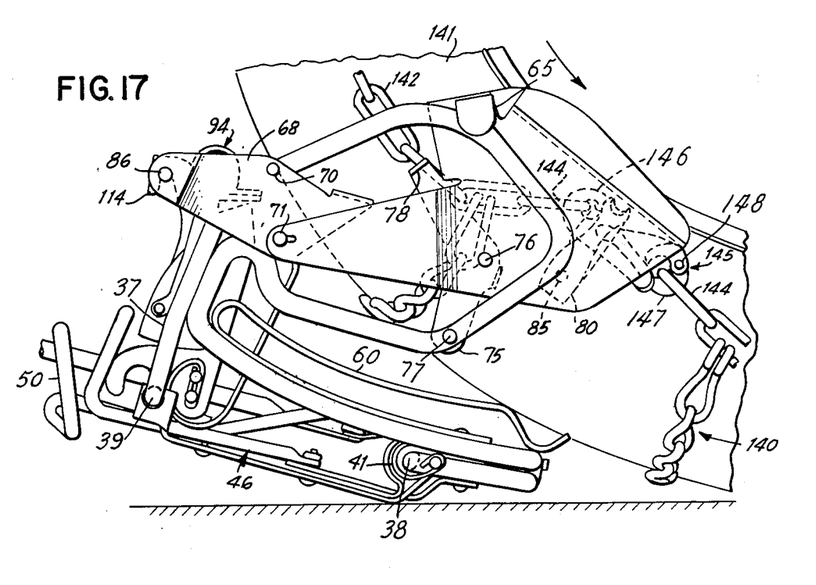

The latching mechanism is best shown in FIGS. 18 and 19 and comprises a hook member 146 and a keeper 147. These parts are pivotally connected by a pin 148 and are relatively movable along the axis of the pin. A helical compression spring 149 is interposed between the head of the pin and the keeper to yieldingly maintain the keeper against the hook member. The hook member defines a recess 150, that is adapted to receive a corresponding side chain and link 144, and is formed with a bent tongue 151. The keeper is connected to the end of its side chain which is remote from end link 144, as shown, and is bent at 152 to define a recess 153 for reception of an edge portion of the hook member when the parts are in locked position (FIG. 17).

The apparatus of this invention and traction chain 140 are assembled by interconnecting chain carrier unit 20, clamp unit 93 and the support unit and by placing various parts of traction chain on the carrier unit and the clamp unit in a manner that will now be described. The first step in this procedure is to expand arms 36 of the carrier unit. This is accomplished by holding chassis 21 with one hand and moving handle 46 toward the right, as viewed in FIG. 2, thereby causing links 43 and arms 36 to expand against the action of the spring 41. The parts are retained in this position by then moving latching handle 50 toward the right and tilting it upwardly into registry with notches 35, as earlier described. Movement of handle 50 to the right will cause corresponding movement or protraction of rods 54 and their fingers 55 in the same direction, so that a substantial portion of each finger will project forwardly beyond its guiding part 57.

Each chain latching mechanism 145 is now mounted on a corresponding arm of the carrier unit with its parts and the parts of the carrier unit in the relative position shown in FIG. 1. It will be observed from that view that hook member 146 and keeper 147 are in relative "open" position. The hook member registers with slot 66 (FIG. 5), and its tongue 151 bears against the outer surface of receptacle wall 67. Keeper 147 is inclined to the hook member and its bent portions 152 registers with notch 83 of latch 80. Also, flange 79 of lever 75 bears against the left edge of latch 80, while flange 78 of this lever bears against flange 74 of lever 68.

The cross chain next to the latching mechanism is then engaged and releasably retained by the hook element 92 of the spring 90. The remaining cross chains, with the exception of the last one, are successively inserted in the openings defined by spring blades 60. The portions of side chains 142 which extend between the indicated cross chains are located outside the carrier unit.

Next, each side chain end link 144 is placed in a corresponding receptacle 106 (FIG. 7) of the clamp unit and is positioned so that its side parts are located and releasably retained in recesses 108 and 111. With the end link in place, the last cross chain is engaged by separator springs 115.

Clamp unit 93 is now expanded by manually moving its arms 100 apart from the relative position shown in FIG. 8 to that shown in FIG. 10. This unit, while held in expanded condition, is applied to the carrier unit by inserting the protracted fingers 55 of the carrier unit into corresponding tubular elements 113 of the clamp unit to the extent allowed by parts 57 of the carrier unit (FIG. 4). Upon release of arms 100, the force exerted by spring 98 causes tubular elements 113 to grip fingers 55 and effect frictional holding engagement between the carrier and clamp units.

The final step in assembling the apparatus is that of connecting the support unit to the carrier unit. To this end, channel bar 120 is inserted in bracket slot 32 of the carrier chassis and is moved forward or to the right, as viewed in FIG. 1, until its hook member 125 is disposed below and in alignment with slot 26. Such alignment is attained when the angulated portion of finger 126 stops against wall 31. It will be necessary, during such movement of the support unit, to press downwardly on latching finger 126, against the action of spring 128, to enable the leading end of the finger to pass through slot 32. The support unit is now tilted to introduce the hook member in slot 26 and is then pulled back, causing the hook member to engage a portion of extension 25 which defines this slot. At the same time, the latching finger is withdrawn from slot 32 and is swung upwardly by its spring so that its free end bears against the outer surface of bracket web 31, as shown in FIG. 1. The support unit is thus rigidly but releasably joined to the carrier unit.

For the purpose of describing the operation of the illustrated apparatus in applying a traction chain to a tire, it is assumed that the apparatus has been assembled with the traction chain mounted thereon, as outlined above. The apparatus is located as shown in FIG. 1 with respect to the tire with base 94 of the clamp unit bearing against the tire tread. Latching handle 50 is pressed downwardly and tilted out of recesses 35. This releases handle 46 and, due to the action of spring 41, carrier unit arms 36 move toward each other and bear against the side walls of the tire. Handle 50 is now retracted, causing rods 54 to be retracted and their fingers 55 to be withdrawn from tubular elements 113 of the clamp unit. This disconnects the clamp unit from the carrier unit and simultaneously allows clamp unit arms 100 to move toward each other and firmly grip the side walls of the tire, due to the force exerted by spring 98.

Figure 14:
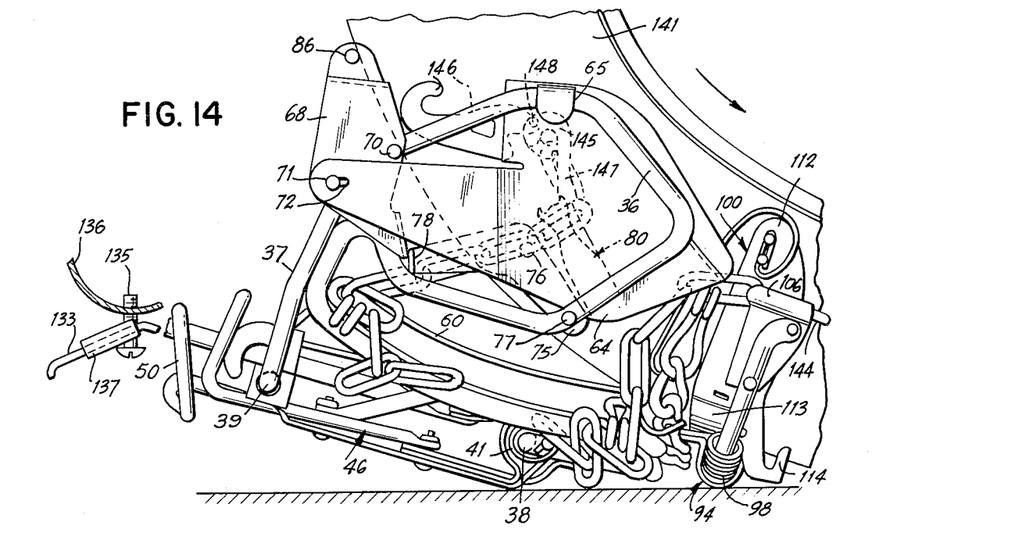
FIG. 14 is a side elevation view of the apparatus of this invention, operatively associated with a tire and the rear bumper of the vehicle, and illustrates the relative position of the parts immediately after the clamp unit has been released from the carrier unit.

Next, the free end of the support unit is raised to proper position so that the shank of bumper screw 135 registers with notch 134 and is maintained in place by keeper 137, as illustrated in FIG. 14.

The vehicle is now driven slowly in a rearward direction, thereby imparting counterclockwise rotation to the tire, as indicated by arrows in several of the views. The carrier unit remains stationary but the clamp unit rotates with the tire through substantially a full turn. During the first increment of rotation of the tire, the clamp unit moves from the position shown in FIG. 14 and starts to withdraw successive cross chains from the carrier unit. As the tire continues to rotate through a full turn, the parts successively assume the relative positions shown in FIGS. 15, 16 and 17.

Figure 15:
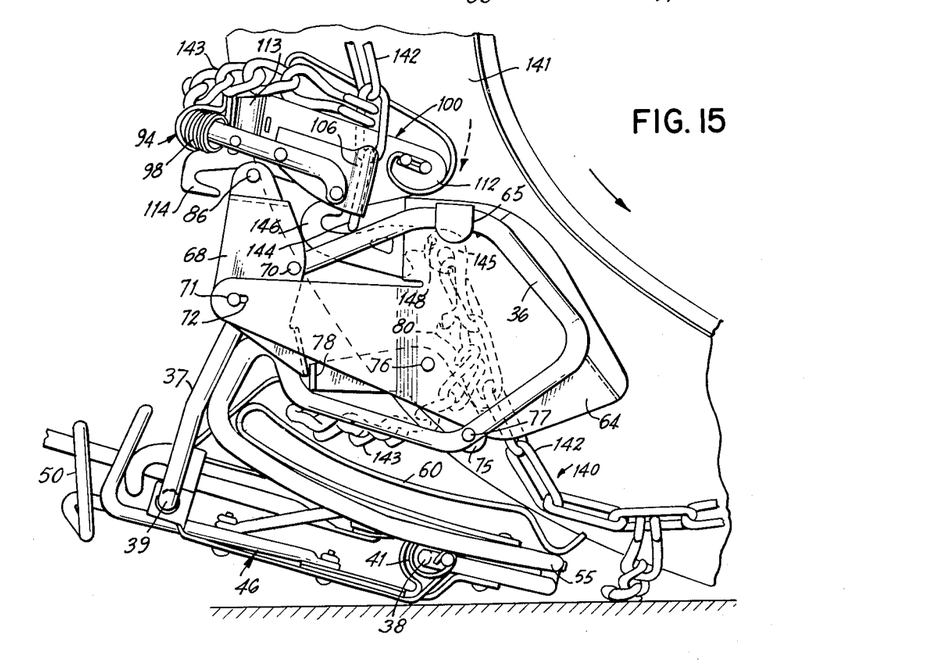
FIGS. 15, 16 and 17 correspond to FIG. 14 and illustrate relative positions of the parts at other successive stages in the course of applying the chain to the tire, FIG. 15 showing the clamp unit meeting the carrier unit after mounting the tire chain on the tire, FIG. 16 showing a latching mechanism at one end of the chain engaging an end link at the other end of the chain, and FIG. 17 showing the latching mechanism in locked engagement with the end link of the chain and the clamp unit supported by the carrier unit but disengaged from the tire.

When the parts are in the relative position shown in FIG. 15, the major part of the chain has been applied to the tire; the leading edges of plates 112 of the clamp unit bear against cross bar 86 which is disposed against the tire tread; hook elements 114 are about to engage the cross bar; and the free ends of hook members 146 are aligned with the openings defined by end links 144. It will be noted that engagement of plates 112 with the cross bar has caused the clamp unit to move downwardly relative to the tire in the direction indicated by the broken arrow in FIG. 15.

Figure 16:
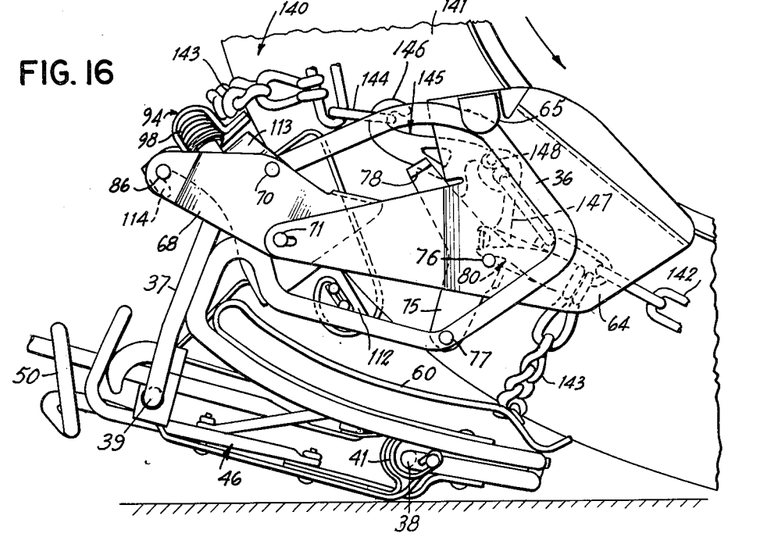

In the course of the next increment of rotation of the tire, i.e. from FIG. 15 to FIG. 16, by the pulling action of the side chains, the end links 144 are engaged by hook members 146 and caused to be withdrawn from receptacles 106 of the clamp unit; and the receptacle walls 64 move a short distance to the right, as viewed in these figures, relative to the arms 36, thereby pivoting the levers 75 in a clockwise direction about the pins 77 to unlock the levers 68 and pivoting these latter levers in a counter-clockwise direction about the pins 70 to bring the cross bar 86 into engagement with the hook elements 114. When the parts are in the relative position shown in FIG. 16, the traction chain is mounted on the tire but its latching mechanisms 145 are still in open or unlocked condition. Also, the clamp unit is coupled to the carrier unit by virtue of hook elements 114 being in engagement with cross bar 86.

As the tire continues to rotate, the latching mechanisms are automatically actuated from unlocked condition (FIG. 16) to locked condition (FIG. 17). In this connection, the force or pull exerted by the side chains on the latching mechanisms causes hook members 146 to first slide out of receptacle slots 66 and then pivot in a counterclockwise direction about the axis of pins 148 (FIG. 16) to locking position relative to keepers 147. Subsequent movement of the chain with the tire pivots latches 80 in a clockwise direction about their pins 85 from the position shown in FIG. 16 to that shown in FIG. 17. This effects disengagement of the latching mechanisms from the latches and final release of the chain from the carrier unit. By the time the latching mechanisms are actuated into locked condition, the clamp unit will have been completely separated from the tire and remains attached to the carrier unit due to the engagement of its hook elements 114 with cross bar 86.

The support unit is then disconnected from bumper screw 135. Also, the carrier unit arms 36 are expanded by actuating handle 46, at which time the carrier unit and the thereto attached clamp unit are withdrawn from the tire.

From the foregoing, it is believed that the construction, operation, objects and advantages of my present invention will be readily comprehended by persons skilled in the art, without further description. It is to be clearly understood, however, that various changes in the apparatus described above and illustrated in the drawings may be made without departing from the scope of the invention, it being intended that all matter contained in the description or shown in the drawings shall be interpreted as illustrative only and not in a limiting sense.

I claim:

1. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a pair of spaced first arms that are adapted to engage the side walls of the tire and first retainer means carried by each first arm for releasably retaining a corresponding latching mechanism in a fixed predetermined position relative to the vehicle during the application of a major portion of said chain to said tire, a tire clamp unit including a pair of spaced second arms that are adapted to engage the side walls of the tire and rotate with the tire and second retainer means carried by each second arm for releasably retaining a corresponding end link in a predetermined position, and a support unit connected to the carrier unit and adapted to be connected to a fixed part of the vehicle for maintaining the carrier unit in a preselected position relative to the tire, said carrier and clamp units including means responsive to predetermined movement of the clamp unit relative to the carrier unit for effecting coupling engagement of each latching mechanism with a corresponding end link, and release of each latching mechanism and end link from corresponding first and second retainer means.

2. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a pair of spaced first arms that are movable toward and away from each other and that are adapted to engage the side walls of the tire, resilient means normally biasing the first arms toward each other and first retainer means carried by each first arm for releasably retaining a corresponding latching mechanism in a predetermined position a tire clamp unit including a pair of spaced second arms that are adapted to engage the side walls of the tire and rotate with the tire and second retainer means carried by each second arm for releasably retaining a corresponding end link in a predetermined position, and a support unit connected to the carrier unit and adapted to be connected to a fixed part of the vehicle for maintaining the carrier unit in a preselected position relative to the tire, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

3. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a pair of spaced first arms that are movable toward and away from each other and that are adapted to engage the side walls of the tire, first resilient means normally biasing the first arms toward each other and first retainer means carried by each first arm for releasably retaining a corresponding latching mechanism in a pedetermined position, a tire clamp unit including a pair of spaced second arms that are movable toward and away from each other and that are adapted to engage the side walls of the tire and rotate with the tire, second resilient means normally biasing the second arms toward each other and second retainer means carried by each second arm for releasably retaining a corresponding end link in a predetermined position, and a support unit connected to the carrier unit and adapted to be connected to a fixed part of the vehicle for maintaining the carrier unit in a preselected position relative to the tire, said support unit including means for varying its effective length, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

4. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a pair of spaced first arms that are movable toward and away from each other and that are adapted to engage the side walls of the tire, resilient means normally biasing the first arms toward each other, actuating means for moving the first arms away from each other against the action of the resilient means and first retainer means carried by each first arm for releasably retaining a corresponding latching mechanism in a predetermined position, a tire clamp unit including a pair of spaced second arms that are adapted to engage the side walls of the tire and rotate with the tire and second retainer means carried by each second arm for releasably retaining a corresponding end link in a predetermined position, and a support unit connected to the carrier unit and adapted to be connected to a fixed part of the vehicle for maintaining the carrier unit in a preselected position relative to the tire, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

5. Apparatus according to claim 4 wherein the actuating means comprises an operating handle movably carried by said carrier unit and a pair of links, each link being pivotally connected at one end to the handle and at its other end to a corresponding first arm.

6. Apparatus according to claim 4 including locking means comprising a latching handle slidably carried by said carrier unit, said latching handle being adapted to releasably engage the actuating means and retain the same in a position whereby to maintain the first arms away from each other.

7. Apparatus according to claim 6 including a pair of rods connected at one end to the latching handle and protractable and retractable relative to the carrier unit in response to corresponding sliding movement of the latching handle, said rods including free end parts, each of which is adapted to engage a corresponding second arm.

8. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a pair of spaced first arms that are movable toward and away from each other and that are adapted to engage the side walls of the tire, resilient means normally biasing the first arms toward each other, actuating means for moving the first arms away from each other against the action of the resilient means, locking means releasably engageable by the actuating means for retaining the actuating means in a position whereby to maintain the first arms away from each other, and first retainer means carried by each first arm for releasably retaining a corresponding latching mechanism in a predetermined position, a tire clamp unit including a pair of spaced second arms that are adapted to engage the side walls of the tire and rotate with the tire and second retainer means carried by each second arm for releasably retaining a corresponding end link in a predetermined position, and a support unit connected to the carrier unit and adapted to be connected to a fixed part of the vehicle for maintaining the carrier unit in a preselected position relative to the tire, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

9. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a pair of spaced first arms that are movable toward and away from each other and that are adapted to engage the side walls of the tire, first resilient means normally biasing the first arms toward each other, actuating means for moving the first arms away from each other against the action of the first resilient means, locking means releasably engageable by the actuating means for retaining the actuating means in a position whereby to maintain the first arms away from each other and first retainer means carried by each first arm for releasably retaining a corresponding latching mechanism in a pedetermined position, a tire clamp unit including a pair of spaced second arms that are movable toward and away from each other and that are adapted to engage the side walls of the tire and rotate with the tire, second resilient means normally biasing the second arms toward each other and second retainer means carried by each second arm for releasably retaining a corresponding end link in a predetermined position, said locking means being releasably engageable with said second arms to hold the same away from each other against the bias of said second resilient means, and a support unit connected to the carrier unit and adapted to be connected to a fixed part of the vehicle for maintaining the carrier unit in a preselected position relative to the tire, said support unit including means for varying its effective length, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

10. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a chassis, a pair of spaced upstanding first arms carried by the chassis and slidable toward and away from each other, said arms being adapted to engage the side walls of the tire, resilient mens connected to and normally biasing the first arms toward each other and first retainer means carried by each first arm for releasably retaining a corresponding latching mechanism in a pedetermined position, a tire clamp unit including a pair of spaced second arms that are adapted to engage the side walls of the tire and rotate with the tire and second retainer means carried by each second arm for releasably retaining a corresponding end link in a predetermined position, and means carried by said carrier unit for maintaining the same in fixed but releasable relationship with said clamp unit, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

11. In apparatus for applying a traction chain to a vehicle wheel tire, the traction chain including a pair of side chains, a plurality of cross chains, a latching mechanism at one end of each side chain and an end link at the other end of each side chain, a chain carrier unit adapted to support the cross chains, said carrier unit including a chassis, a pair of spaced upstanding first arms carried by the chassis and slidable toward and away from each other, said arms being adapted to engage the side walls of the tire, resilient means connected to and normally biasing the first arms toward each other, actuating means for moving the first arms away from each other against the action of the resilient means and first retainer means carried by each first arm for releasably retaining a corresponding latching mechanism in a fixed predetermined position relative to the vehicle during the application of a major portion of said chain to said tire, a tire clamp unit including a pair of spaced second arms that are adapted to engage the side walls of the tire and rotate with the tire and second retainer means carried by each second arm for releasably retaining a corresponding end link in a predetermined position, and a support unit connected to the carrier unit and adapted to be connected to a fixed part of the vehicle for maintaining the carrier unit in a preselected position relative to the tire, said carrier and clamp units including means responsive to predetermined movement of the clamp unit relative to the carrier unit for effecting coupling engagement of each latching mechanism with a corresponding end link and release of each latching mechanism and end link from corresponding first and second retainer means.

12. Apparatus according to claim 11 wherein the actuating means comprises an operating handle slidable along the chassis and a pair of links, each link being pivotally connected at one end to the handle and at its other end to a corresponding first arm, the apparatus also including a latching handle slidable along the chassis and adapted to releasably engage the operating handle and retain the same in a position whereby to maintain the first arms away from each other, and a pair of rods connected at one end to the latching handle and protractable and retractable relative to the chassis in response to corresponding sliding movement of the latching handle, each rod having a free end part which is adapted to engage a corresponding second arm.

References Cited in the file of this patent

UNITED STATES PATENTS

| | | |
|---|---|---|
| 1,257,647 | Spahn | Feb. 26, 1918 |
| 1,346,469 | Schneider | July 13, 1920 |
| 1,404,690 | Farran | Jan. 24, 1922 |
| 1,540,644 | Mamaux | June 2, 1925 |
| 2,159,626 | Boycott | May 23, 1939 |
| 2,507,376 | Klein | May 9, 1950 |
| 2,768,545 | Bertelsen | Oct. 30, 1956 |
| 2,990,737 | Smith-Miller | July 4, 1961 |